UNITED STATES PATENT OFFICE.

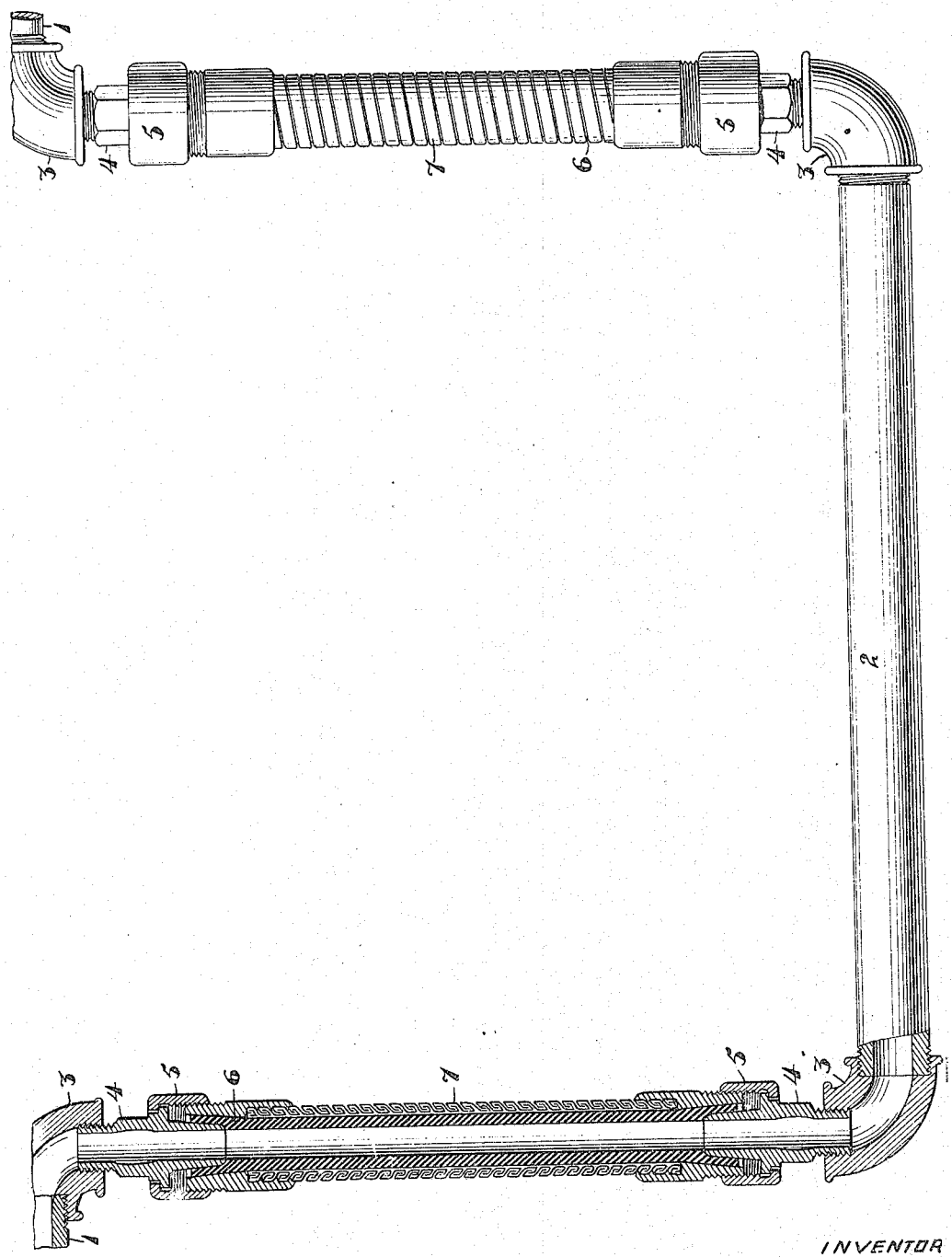

JESSE C. MARTIN, JR., OF SAN FRANCISCO, CALIFORNIA.

TRAIN-PIPE CONNECTION.

1,129,308.   Specification of Letters Patent.   Patented Feb. 23, 1915.

Application filed March 30, 1914.   Serial No. 828,219.

*To all whom it may concern:*

Be it known that I, JESSE C. MARTIN, Jr., a citizen of the United States, residing at San Francisco, in the county of San Francisco and State of California, have invented new and useful Improvements in Train-Pipe Connections, of which the following is a specification.

Train couplings have heretofore been usually constructed of rubber hose attached to coupling members and hanging in a curve from car to car. Such rubber hose has, even when at rest, been subjected to strain, owing to its curvature, by which it has been compressed on one side and expanded on the other. This strain, which is never absent from the hose, is very much greater than the strain which the hose undergoes by its change in curvature due to the motion of the car. Consequently the rubber hose, being always subjected to this strain, at length cracks open on the side where it is stretched, and it becomes useless.

The object of the present invention is to provide a train coupling the life of which will be very greatly increased by the hose being not normally subjected to any bending strain whatever and subjected to but slight bending strain when the car is in motion.

In the accompanying drawing, the figure is a broken side view of my improved conduit.

Referring to the drawing, 1 indicates the ends of two pipes to be joined by the flexible conduit, and 2 indicates an intermediate rigid pipe. Said ends 1 and the ends of the pipe 2 are joined by elbows 3 to nipples 4, which are connected by couplings 5 to ends of rubber tubes 6 incased in flexible metal tubes 7 of ordinary construction. My invention consists in the provision of this rigid intermediate pipe 2 of such length that the rubber tubes when connected to said elbows will hang vertically in their normal position. By reason of their hanging vertically said rubber tubes are not subjected to any bending strain whatever, except when they are bent by reason of the motion of the car, and such bending is very slight as compared with that to which the rubber hose of the old form of coupling was subjected, even when the cars were at rest. In other words, the rubber hose coupling was always undergoing great strain even when at rest, and the curvature and strain were increased when in motion. By my invention there is no bending strain on the rubber when at rest and a very slight one when in motion. Consequently the life of the coupling is very greatly prolonged.

I claim:—

A train pipe coupling comprising vertical hose members flexible at all points throughout their entire lengths, a conduit between their lower ends, and means detachably connecting the hose members with the conduit.

In testimony whereof I have hereunto set my hand in the presence of two subscribing witnesses.

JESSE C. MARTIN, JR.

Witnesses:
FRANCIS M. WRIGHT,
D. B. RICHARDS.